(12) United States Patent
Minto et al.

(10) Patent No.: US 8,355,855 B2
(45) Date of Patent: Jan. 15, 2013

(54) SYSTEMS AND METHODS FOR CONTROLLING AN INTEGRATED DRIVE TRAIN

(75) Inventors: Karl Dean Minto, Schenectady, NY (US); Justin Aaron Allen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 82 days.

(21) Appl. No.: 12/784,667

(22) Filed: May 21, 2010

(65) Prior Publication Data

US 2011/0288731 A1 Nov. 24, 2011

(51) Int. Cl.
- *F02C 7/36* (2006.01)
- *F02C 9/00* (2006.01)
- *G06F 19/00* (2011.01)
- *G06G 7/70* (2006.01)

(52) U.S. Cl. ........... 701/100; 701/54; 477/30; 60/39.25; 60/330

(58) Field of Classification Search .................. 701/100, 701/51, 54, 99, 58, 53; 60/773, 793, 787, 60/788, 39.24, 39.25, 805, 668, 330, 332, 60/355; 700/287, 290, 273, 282; 477/30, 477/31

See application file for complete search history.

(56) References Cited

U.S. PATENT DOCUMENTS

| | | | |
|---|---|---|---|
| 3,603,160 A | 9/1971 | Bloom | |
| 3,795,104 A * | 3/1974 | McLean | 60/39.27 |
| 4,734,628 A | 3/1988 | Bench et al. | |
| 5,966,925 A * | 10/1999 | Torikai et al. | 60/778 |
| 6,035,626 A * | 3/2000 | Wahl et al. | 60/773 |
| 6,463,740 B1 * | 10/2002 | Schmidt et al. | 60/772 |
| 6,647,724 B1 * | 11/2003 | Arnold et al. | 60/608 |
| 6,960,900 B2 * | 11/2005 | Fogarty et al. | 322/29 |
| 7,926,287 B2 * | 4/2011 | Ullyott et al. | 60/776 |
| 2009/0054191 A1 * | 2/2009 | Holt et al. | 475/59 |
| 2011/0231021 A1 * | 9/2011 | Karpman et al. | 700/282 |

* cited by examiner

*Primary Examiner* — Christine Behncke
(74) *Attorney, Agent, or Firm* — Sutherland Asbill & Brennan LLP

(57) ABSTRACT

Certain embodiments of the invention may include systems and methods for controlling an integrated drive train. According to an example embodiment of the invention, a method for controlling a gas turbine drive train includes measuring speed associated with the drive train, controlling fuel flow to a gas turbine based at least in part on a speed command and the measured speed, controlling one or more guide vanes associated with a torque converter based at least in part on the speed command and an expected power output of the torque converter, and selectively coordinating respective torque contributions from the torque converter and the gas turbine.

17 Claims, 7 Drawing Sheets

SYSTEMS AND METHODS FOR CONTROLLING AN INTEGRATED DRIVE TRAIN

FIELD OF THE INVENTION

This invention generally relates to power generation, and in particular, to systems and methods for controlling an integrated drive train.

BACKGROUND OF THE INVENTION

Drive trains are often used in gas turbine energy conversion facilities and in turbine compressor test facilities for transferring torque to or from components connected to the drive train. Integrated drive trains may include components such as starting motors, gearboxes, compressors, shafts, etc. Most of the drive train components are connected to a common rotating shaft or coupled to the shaft, for example, via gearboxes. Certain components on the drive train may supply torque while other components may consume torque. For example, an electric motor may be used to supply starting torque for the drive train, while a compressor may consume part of the torque provided by the motor. To complicate matters, a gas turbine, for example, may consume torque during ramp-up to full speed and before being fired, but once the combustors begin to burn fuel at a sufficient rate, the gas turbine may begin to supply torque to the drive train.

The positive (supply) or negative (consumption) torque coordination to the drive train from multiple torque producing components on large integrated drive trains have, in the past, resulted in torque oscillations and marginally stable operations, often requiring manual adjustments.

BRIEF SUMMARY OF THE INVENTION

Some or all of the above needs may be addressed by certain embodiments of the invention. Certain embodiments of the invention may include systems and methods for controlling speed and load in an integrated drive train.

According to an example embodiment of the invention, a method is provided for controlling a gas turbine drive train. The method includes measuring speed associated with the drive train, controlling fuel flow to a gas turbine based at least in part on a speed command and the measured speed, controlling one or more guide vanes associated with a torque converter based at least in part on the speed command and an expected power output of the torque converter, and selectively coordinating respective torque contributions from the torque converter and the gas turbine.

According to another example embodiment, a system is provided. The system includes a drive motor, a torque converter, a compressor, a gas turbine, a drive train and at least one processor. The processor is configured to execute computer-executable instructions to receive measured speed associated with the drive train, control fuel flow to the gas turbine based at least in part on a speed command and the measured speed, control one or more guide vanes associated with the torque converter based at least in part on the speed command and an expected power output of the torque converter, and selectively coordinate respective torque contributions from the torque converter and the gas turbine.

According to another example embodiment, an apparatus is provided for controlling a gas turbine drive train. The apparatus may include at least one processor configured to execute computer-executable instructions to receive measured speed associated with a drive train, control fuel flow to a gas turbine based at least in part on a speed command and the measured speed, control one or more guide vanes associated with a torque converter based at least in part on the speed command and an expected power output of the torque converter, and selectively coordinate respective torque contributions from the torque converter and the gas turbine.

Other embodiments and aspects of the invention are described in detail herein and are considered part of the claimed invention. Other embodiments and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable various components associated with the drive train to be monitored and controlled to maintain a relatively smooth and steady operation of the drive train. Various components and systems for controlling the drive train, according to example embodiments of the invention, will now be described with reference to the accompanying figures.

Figure 1:
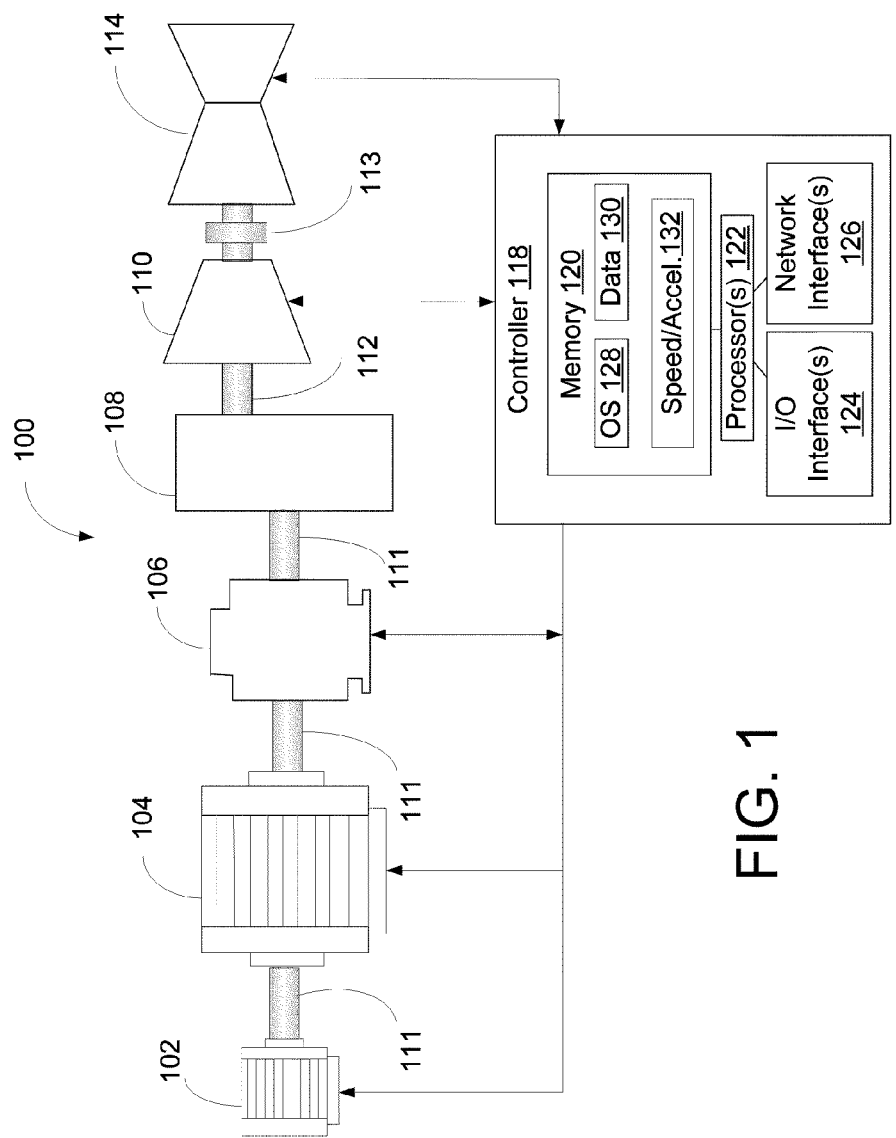
FIG. 1 is a block diagram of an illustrative drive train and control system, according to an example embodiment of the invention.

FIG. 1 shows a block diagram of a drive train and a control system 100, according to an example embodiment of the invention. The drive train and control system 100 may be used, for example, in compressor testing. In this setup a gas turbine 114 and a load compressor 110 may be coupled to a high-speed side of a gear box 108 via a first shaft 112, whereas a torque converter 106 and a drive motor 104 may be coupled-together on the low-speed side of the gear box 108 by a second shaft 111. A starting motor 102 may be provided, in an example embodiment, for starting and accelerating the shaft 111 to a synchronous speed of the drive motor 104.

According to example embodiments of the invention, a controller 118 may be utilized to monitor speed and control the various components associated with the drive train, and to regulate the speed of the drive train by controlling the torques applied to the shafts 111, 112 from the gas turbine 114, the load compressor 110, the torque converter 106, and/or the start and drive motors 102, 104.

According to example embodiments of the invention, the controller 118 may include a memory 120, one or more processors 122, and one or more input/output interfaces 124. The controller may also include one or more network interfaces 126. In certain example embodiments of the invention, the memory 120 may include an operating system 128, data 130, and one or more modules 132 for controlling the speed and/or acceleration of the various drive train components.

According to example embodiments of the invention, the controller 118 may operate in different modes, depending on whether the drive train is accelerating or decelerating, whether it is operating in steady state, and whether the gas turbine is coupled to the drive train or not. For example, when the drive train is coming up to speed, the controller 118 may coordinate the actions of the start motor 102, gas turbine 114, torque converter 106 and/or load compressor 110 in order to accelerate the drive train from zero speed to an appropriate speed for initiation of compressor 110 testing or mapping. Once the desired operating speed for a particular compressor test has been obtained, the controller 118 may then switch to a different mode of operation and hold the drive train speed constant while the load on the compressor 110 is varied.

As a further complication, the drive train may be operated in a number of different configurations. Specifically in one embodiment, the coupling 113 between the gas turbine 114 and the load compressor 110 may be disconnected, allowing the drive train to operate with the load compressor 110, gearbox 108, torque converter 106, and electric motor 104 only. In another example embodiment, the coupling 113 between the gas turbine 114 and the load compressor 110 may be connected, but the gas turbine 114 may not be fired, thus providing additional torque loading on the drive train.

Figure 5:
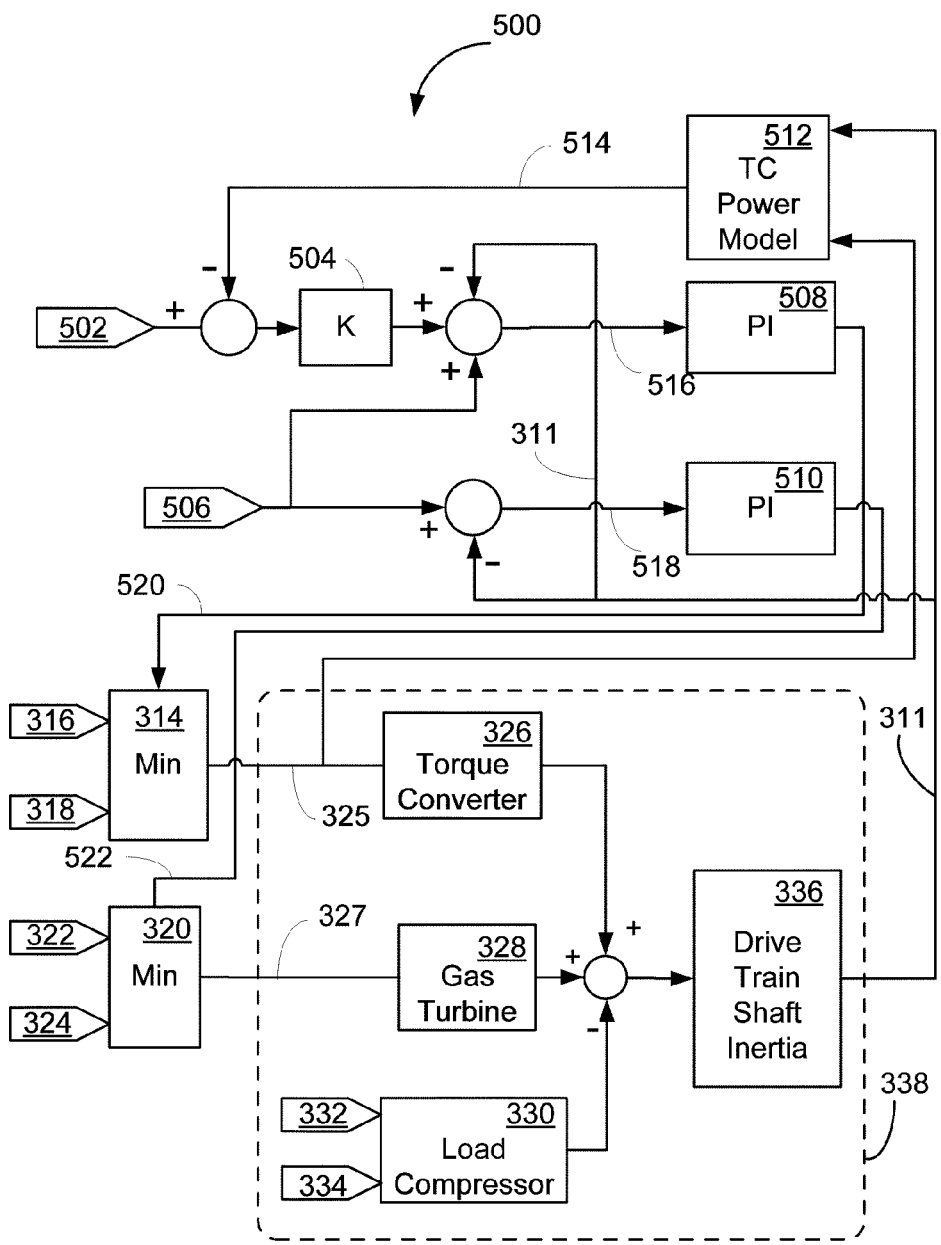
FIG. 5 is a block diagram of an illustrative drive train speed and load control system, according to an example embodiment of the invention.

In accordance with example embodiments of the invention, the processor(s) 122 may be further configured to control one or more guide vanes associated with the torque converter 106 based at least in part on a power command, such as 502 in FIG. 5. In an aspect of one embodiment of the invention, the expected power output, such as 514 in FIG. 5, of the torque converter 106 may be based at least in part on the measured speed, such as 311 in FIG. 3, and a guide vane command, such as 325 in FIG. 3. The guide vane command 325 may be based at least in part on the measured speed 311. In certain example embodiments of the invention, fuel flow to the gas turbine 114 may be controlled when the drive train 111 is coupled to the gas turbine 114 and when the gas turbine 114 is active.

In an example embodiment of the invention, torque contributions from the torque converter 106 and the gas turbine 114 may be selectively coordinated. The coordination may include biasing the torque converter acceleration reference, such as 406 in FIG. 4, greater than or equal to the gas turbine acceleration reference, such as 408 in FIG. 4, during transient operation, such as 216 in FIG. 2, to allow the torque converter to dominate the control. In other embodiments, the gas turbine may be allowed to dominate the acceleration control during the transient operations. In an example embodiment of the invention, the expected power output, such as 514, of the torque converter 106 may be based at least in part on a torque converter power model, such as 512 in FIG. 5, where the torque converter power model 512 may be based at least in part on the measured speed, such as 311, and a parameter associated with the one or more guide vanes.

Figure 2:
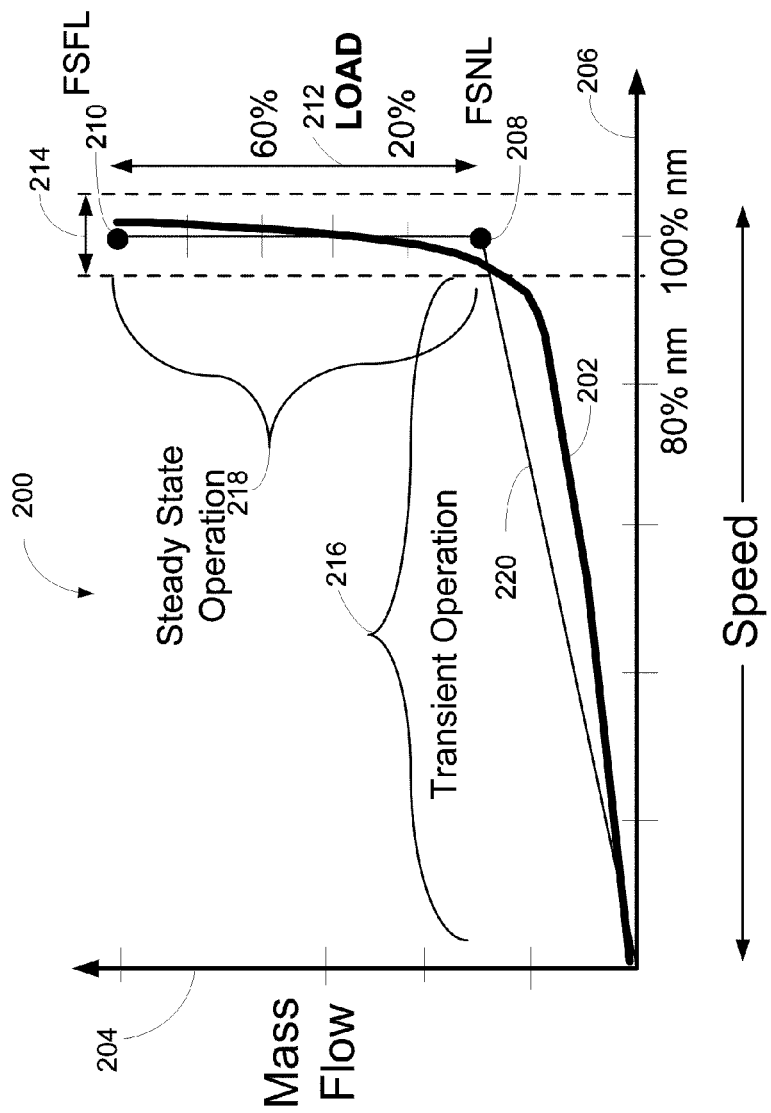
FIG. 2 is a graph of example drive train dynamics, according to an example embodiment of the invention.

FIG. 2 depicts a drive train dynamics graph 200, illustrating example transient 216 and steady-state 218 operational regions in an integrated drive train control system according to an embodiment of the invention. An example drive train load line 202 is shown relating load compressor mass flow 204 to the speed 206 of the drive train. The graph 200 shows that a drive train may be accelerated through the transient region 216, from zero speed to a speed within the full operating speed range 214. The graph 200 includes a full speed no load point 208 where approximately 100% of the nominal speed has been reached, but there is no appreciable load on the drive train. The turbine or drive train may continue to operate within the steady state operation region 218 while a load 212 is varied up to the full-scale full load point 210. The steady state operating region 218 may be defined by drive train speed 206 operating within the operating range 214, but the load 212 may vary due to changes in mass flow 204 or pressure ratio on the compressor, for example.

Figure 3:
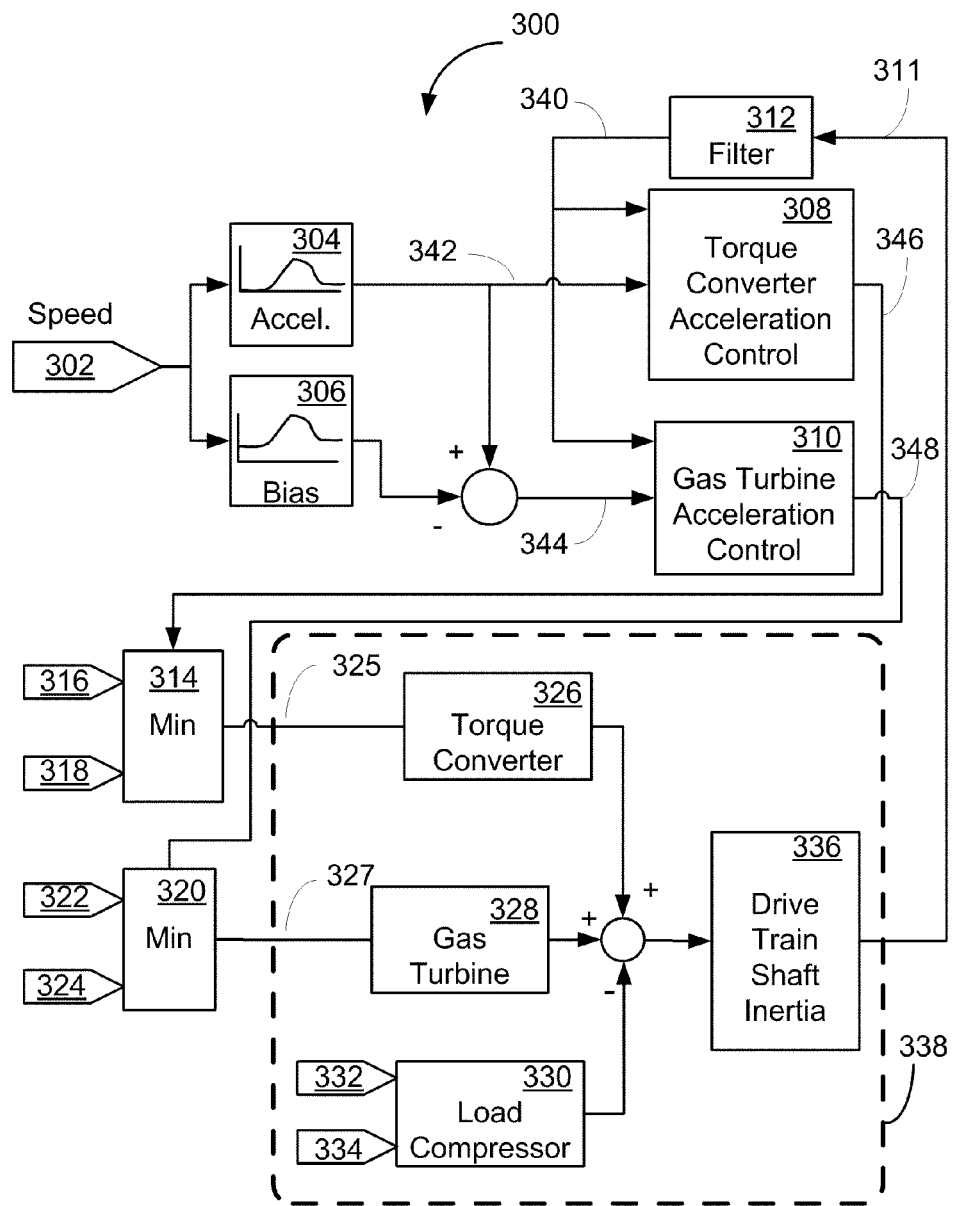
FIG. 3 is a block diagram of an illustrative drive train acceleration control system, according to an example embodiment of the invention.

FIG. 3 is a conceptual block diagram representation of a drive train acceleration control 300, according to example embodiments of the invention. This control configuration may be applied for controlling the drive train components in the transient operating region, such as 216 in FIG. 2, where transient speed control is required as the drive train accelerates from zero speed to full speed no load (FSNL) 208.

The blocks enclosed within the dashed line of FIG. 3 represent parts of the drive train system 338, and are included to help illustrate the operation of the acceleration control 300. For example, torque producing or consuming aspects of the drive train components are represented by the torque converter 326, the gas turbine 328, and the load compressor 330. The net torque acting on the drive train shaft inertia 336 may result in acceleration, deceleration, or steady-state speed operation of the drive train. For instance, the load compressor 330 may act as a negative torque on the drive train, acting to reduce the speed of the shaft(s), such as 111, 112 in FIG. 1. The output torque of the load compressor 330 may be a complex function involving many parameters, but a simplified representation is provided in FIG. 3, where the contribution of airflow 332 and pressure ratio 334 is shown as inputs to control the output torque of the load compressor 330. Similarly, the output torque of the gas turbine 328 may contribute either a positive or a negative torque to the drive train, depending on the ignition state of combustors associated with the turbine, and/or the fuel flow 327 to the combustors. Again, the representation of the output torque of the gas turbine 328 is considerably simplified, and the diagram shows only the impact of fuel flow 325 on the output torque of the gas turbine 326. In a similar manner, the output torque of the torque converter 326 may act to accelerate the shaft, and may be governed primarily by a position of one or more guide vanes 325 associated with the torque converter 326.

The principal torque producing components of the drive train (for example, the gas turbine 328, torque converter 326, and load compressor 330) therefore may contribute either positively or negatively to the drive train shaft inertia 336 to influence the speed of the drive train. If the net torque applied to the shaft is positive, the drive train shaft will accelerate. If the net torque is negative, the shaft will decelerate, and if the net torque applied to the shaft is zero, the shaft speed will remain constant. In other words, if the torque consumed by the load compressor 330 is balanced by the torque generated by the gas turbine 328 and the torque converter 326, then the drive train speed will remain constant.

As indicated in FIG. 3, the drive train acceleration control 300 may include two parallel feedback loops. One of the loops may include a guide vane position 325 for controlling the output torque of the torque converter 326, and the other loop may include fuel flow 327 for controlling the output torque of the gas turbine 328. According to example embodiments of the invention, one or more filters 312 may be utilized to condition the speed feedback signal 311. For example, the filter 312 may allow a certain range of frequencies to pass, or it may help smooth discontinuous or noisy signals. According to certain embodiments of the invention, the filter 312 may differentiate the speed feedback signal 311 to compute drive train shaft acceleration 340. In accordance with example embodiments of the invention, the shaft acceleration 340 may be utilized to derive control signals 325, 327 for the torque converter 326 and/or the gas turbine 328. For example, a torque converter acceleration control 308 and/or a gas turbine acceleration control 310, respectively, may include a proportional control algorithm (P), a proportional plus integral (PI), or a proportional plus integral plus derivative (PID) algorithm. Other similar algorithms according to embodiments of the invention may be included in or otherwise implemented in or by these blocks.

According to certain example embodiments of the invention, the torque converter acceleration control 308 may compare shaft acceleration 340 to a reference or target acceleration 342 to derive a torque converter control signal 346. In an example, the gas turbine acceleration control 310 may compare shaft acceleration 340 to a biased reference acceleration 344 to derive a gas turbine control signal 348.

According to example embodiments of the invention, minimum function blocks 314, 320 may further modify the torque converter control signal 346 and the gas turbine control signal 348 respectively to allow for the incorporation of other control objectives into the drive train acceleration control 300. For example, one or more safeguarding limits such as 316, 318, 322, 324 may be utilized to override either the torque converter control signal 346 or the gas turbine control signal 348 to further protect the system.

The torque converter acceleration control 308, for instance, may produce a torque converter control signal 346 to adjust one or more guide vanes in the torque converter in proportion to the error between the reference acceleration 342 and the actual shaft acceleration 340. If the shaft acceleration 340 is less than the reference acceleration 342, then the guide vanes of the torque converter may be commanded to open further, in order to produce more output torque and hence increase the shaft acceleration. In accordance with an example embodiment, the gas turbine acceleration control 310 may operate in a similar manner, adjusting the fuel flow 327 to the gas turbine based on a difference error between a biased reference acceleration 344 and the actual shaft acceleration 340.

The biased reference acceleration 344 will now be described in reference to FIG. 3 and FIG. 4. According to an aspect of the invention, an acceleration schedule 304 may be provided for the torque converter acceleration control 308. In an example embodiment, a separate, non-identical, or biased reference acceleration 344 signal may be derived for the gas turbine acceleration control 310. For example, a baseline acceleration reference 342 signal may be provided directly to the torque converter acceleration control 308, whereas the biased reference acceleration 344 signal applied to the gas turbine acceleration control 310 may be a modified version of the reference acceleration 342. For example, the gas turbine acceleration control 310 may be derived, at least in part, by subtracting the gas turbine acceleration bias 306 from the torque converter acceleration schedule 304.

Figure 4:
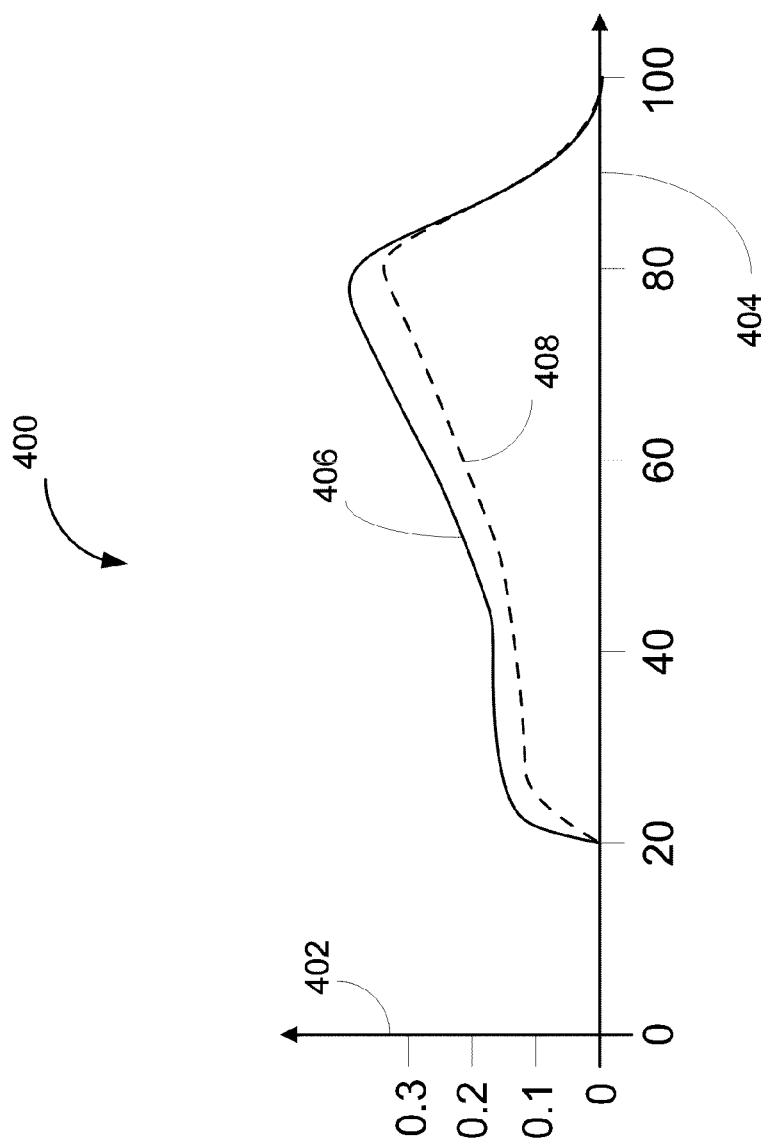
FIG. 4 is a graph of example acceleration reference schedules, according to an example embodiment of the invention.

FIG. 4 indicates example acceleration schedules 400 showing acceleration 402 vs. speed 404 for the torque converter acceleration reference 406 and the biased gas turbine acceleration reference 408 in accordance with an embodiment of the invention. In certain embodiments, the different acceleration schedules may allow the torque converter to dominate the control of the drive train during acceleration. This aspect of one embodiment of the invention may help stabilize and smooth the acceleration of the drive train.

FIG. 5 depicts an example drive train speed and load control 500 according to one embodiment that may be configured for controlling the drive train speed and balancing the torque contributions from the torque converter and the gas turbine when the drive train has reached operating speed, and when the gas turbine is connected to the drive train. According to embodiments of the invention, the drive train speed and load control 500 may include the drive train system, such as 338 of FIG. 3, and minimum functions such as 314, 320 that have been described above with respect to FIG. 3.

In accordance with example embodiments of the invention, a PI control block 510 may be utilized to produce a nominal fuel signal 522 based on the difference between the actual shaft speed, such as 311 in FIG. 3, and a speed reference signal 506. The nominal fuel signal 522 may be used to adjust gas turbine fuel flow. If the shaft speed such as 311 is less than the reference 506, then the system may command more fuel to the gas turbine to increase its output torque, and vice versa.

In a similar manner, another PI control block 508 may adjust the torque converter guide vanes based on the difference between the shaft speed such as 311 and the reference speed 506. In accordance with an embodiment of the invention, an additional signal may be utilized within the speed control loop based on a scaled difference between the torque converter power output signal 514, as estimated by a torque converter power model 512 and a power reference command 502. According to an example embodiment of the invention, the feedback loop, which includes the torque converter power model 512, may be based on estimated torque converter power output, and it may act to serve two purposes. First, it may help to stabilize the inner torque converter speed control loop, and prevent or otherwise minimize unwanted torque output oscillations between the gas turbine and the torque converter. Secondly, it may provide a mechanism to adjust the relative balance between gas turbine torque output and torque converter torque output should the need arise during operation or testing.

Figure 6:
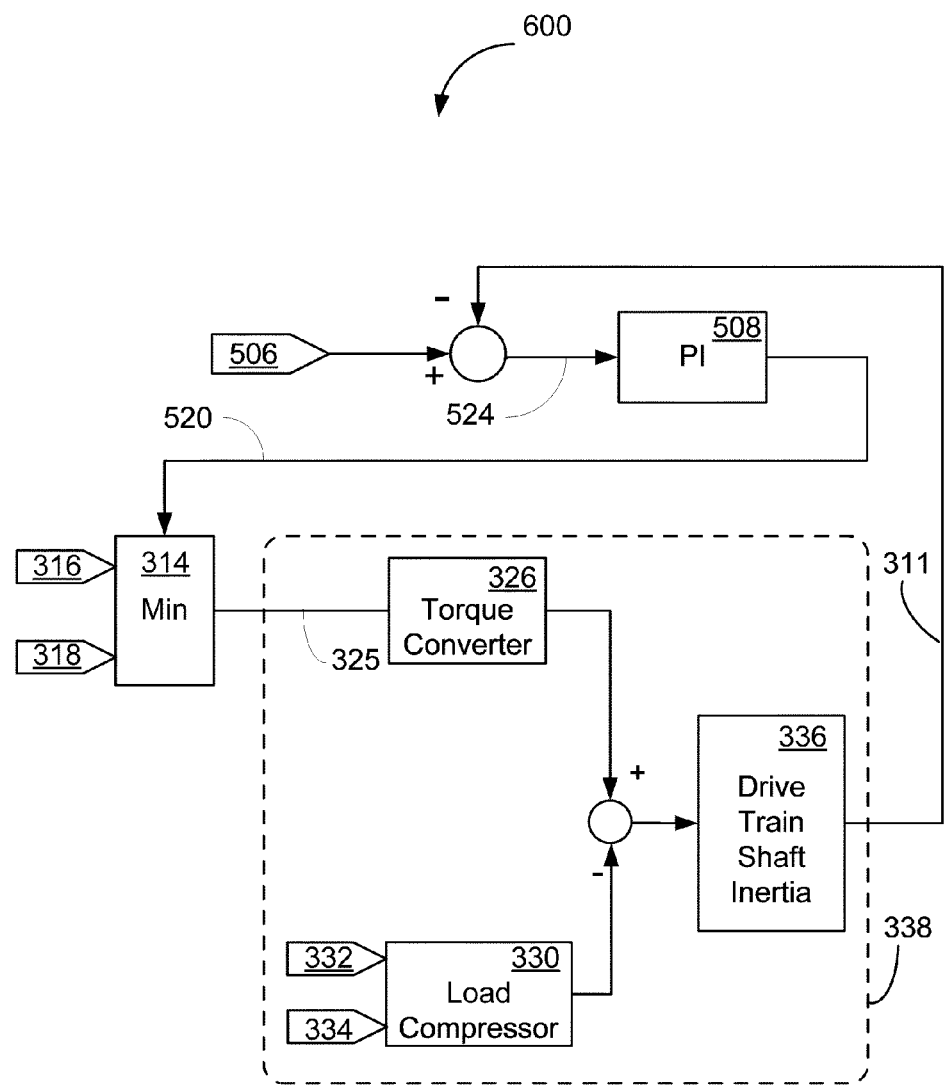
FIG. 6 is block diagram of an illustrative simplified drive train speed and load control system, according to an example embodiment of the invention.

FIG. 6 depicts a simplified drive train speed and load control 600, according to an example embodiment of the invention. The simplified drive train speed and load control 600 may be configured as shown when the drive train is operated with the gas turbine decoupled or unfired. In this case, and for simplicity, part of the control system that controls the gas turbine speed (and shown in FIG. 5) may be disabled. According to an example embodiment, the gas turbine may place drag torque (negative torque) on the drive train when it is coupled but unfired. In the case when the gas turbine is completely decoupled from the drive train, its torque contribution may be zero.

When the drive train is operated with the gas turbine such as 114 decoupled or unfired, the part of the controller that controls torque converter speed and droop load control may be simplified by disabling the outer feedback loop (including the torque converter power model 512). Therefore, according to an example embodiment, the control method for the decoupled or unfired turbine may be simplified to a PI block 508 acting on the shaft speed error 524 to produce a nominal torque control signal 520. As in the previous example embodiments, safeguarding limits 316, 318, may be utilized to override nominal torque control signal 520 to further protect the system.

Figure 7:
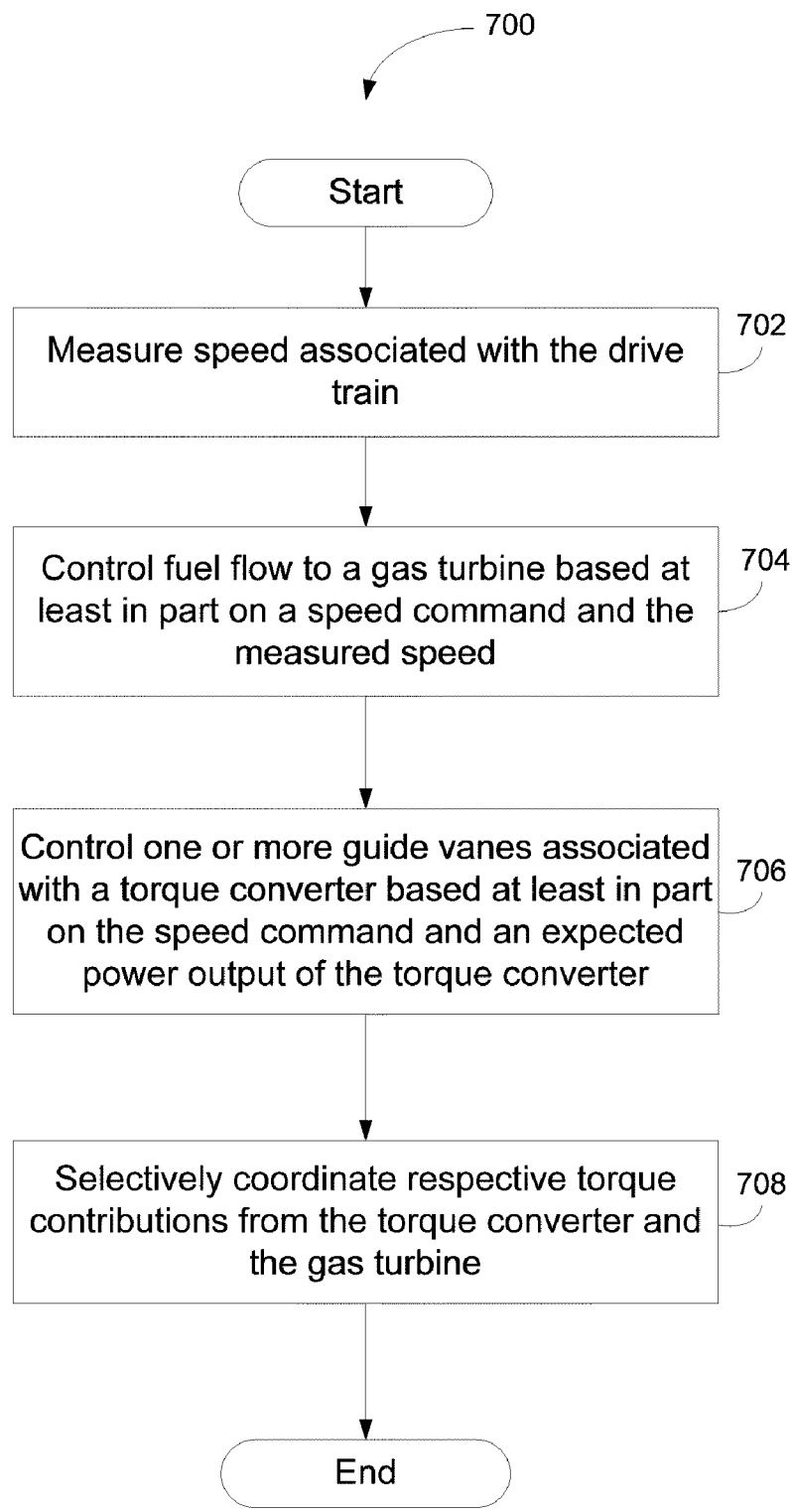
FIG. 7 is a flow diagram of an example method according to an example embodiment of the invention.

An example method 700 for controlling a gas turbine drive train in accordance with one embodiment will now be described with reference to the flowchart of FIG. 7. The method starts in block 702 where speed associated with the drive train is measured. In block 704, fuel flow to a turbine is controlled based at least in part on a speed command and the measured speed. In block 706 one or more guide vanes associated with a torque converter are controlled based at least in part on the speed command and an expected power output of the torque converter. In block 708, the respective torque contributions from the torque converter and the turbine are selectively coordinated. The method 700 ends after block 708.

According to example embodiments of the invention, controlling one or more guide vanes associated with the torque converter, such as 326 in FIG. 3, may further be based on a power reference command, such as 502 in FIG. 5. In and example embodiment, the expected power output, such as 514 in FIG. 5, of the torque converter, such as 326 in FIG. 3, may be based at least in part on the measured speed, such as 311 in FIG. 3, and a guide vane command, such as 325 in FIG. 3. In an aspect of the invention, the guide vane command such as 325 may be based at least in part on the measured speed such as 311. According to an example embodiment, controlling fuel flow to the turbine, such as 328 in FIG. 3, may include controlling fuel flow when a drive train is coupled to the turbine 328 and when the turbine 328 is active. In certain example embodiments, selectively coordinating respective torque contributions from the torque converter such as 326 and the turbine 328 may include biasing torque converter acceleration, such as 406 in FIG. 4, greater than or equal to turbine acceleration 408 during transient operation, such as 216 in FIG. 2. Furthermore, in certain example embodiments of the invention, the expected power output, such as 514, of the torque converter such as 326 may be based at least in part on a torque converter power model, such as 512 in FIG. 5, where the torque converter power model 512 may be based at least in part on the measured speed such as 311 and a parameter associated with the one or more guide vanes.

Accordingly, example embodiments of the invention can provide the technical effects of creating certain systems and methods that enable various components associated with the drive train to be monitored and controlled to maintain a relatively smooth and steady operation of the drive train. Example embodiments of the invention can provide further technical effects of creating certain systems and methods that provide mechanical drive train control for compressor testing. Example embodiments of the invention can provide the further technical effects of providing systems and methods for controlling speed, acceleration and/or load for transient and operating regions, and typical configurations of a drive train for a compressor test bed. Example embodiments of the invention can provide the further technical effects of providing systems and methods for configuring a drive train with a relatively large electric motor and/or torque converter as torque producing components.

In example embodiments of the invention, the drive train and control system 100, the drive train acceleration control system 300, the drive train speed and load control system 400, the drive train speed and load control system 500, and/or the simplified drive train speed and load control system 600 may include any number of software and/or hardware applications that are executed to facilitate any of the operations.

In example embodiments, one or more I/O interfaces may facilitate communication between the drive train and control system 100, the drive train acceleration control system 300, the drive train speed and load control system 400, the drive train speed and load control system 500, and/or the simplified drive train speed and load control system 600, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the drive train and control system 100, the drive train acceleration control system 300, the drive train speed and load control system 400, the drive train speed and load control system 500, and/or the simplified drive train speed and load control system 600. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the drive train and control system 100, the drive train acceleration control system 300, the drive train speed and load control system 400, the drive train speed and load control system 500, and/or the simplified drive train speed and load control system 600 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network, any wired network, any wireless network, etc., for communication with external devices and/or systems.

As desired, embodiments of the invention may include the drive train and control system 100, the drive train acceleration control system 300, the drive train speed and load control system 400, the drive train speed and load control system 500, and/or the simplified drive train speed and load control system 600 with more or less of the components illustrated in the accompanying figures.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for controlling a drive train for a gas turbine, the drive train comprising at least a torque converter, the method comprising:
   measuring speed associated with the drive train;
   controlling fuel flow to a gas turbine based at least in part on a speed command and the measured speed;
   controlling one or more guide vanes associated with the torque converter based at least in part on the speed command and an expected power output of the torque converter, wherein controlling the one or more guide vanes comprises adjusting a position of the one or more guide vanes; and
   selectively coordinating respective torque contributions from the torque converter and the gas turbine, wherein selectively coordinating respective torque contributions comprises biasing a torque converter acceleration reference greater than or equal to a gas turbine acceleration reference during transient operation.

2. The method of claim 1, wherein controlling one or more guide vanes associated with the torque converter is further based on a power command.

3. The method of claim 1, wherein the expected power output of the torque converter is based at least in part on the measured speed and a guide vane command.

4. The method of claim 3, wherein the guide vane command is based at least in part on the measured speed.

5. The method of claim 1, wherein controlling fuel flow to the gas turbine comprises controlling fuel flow when the drive train is coupled to a gas turbine and when the gas turbine is active.

6. The method of claim 1, wherein the expected power output of the torque converter is based at least in part on an output from a torque converter power model.

7. The method of claim 6, wherein the torque converter power model generates the output based at least in part on the measured speed and a parameter associated with the one or more guide vanes.

8. A system comprising:
   a torque converter;
   a gas turbine;
   a drive train; and
   at least one processor configured to execute computer-executable instructions to:
      receive measured speed associated with the drive train;
      control fuel flow to the gas turbine based at least in part on a speed command and the measured speed;
      control one or more guide vanes associated with the torque converter based at least in part on the speed command and an expected power output of the torque converter, wherein controlling the one or more guide vanes comprises adjusting a position of the one or more guide vanes; and
      selectively coordinate respective torque contributions from the torque converter and the gas turbine, wherein selectively coordinating respective torque contributions comprises biasing a torque converter acceleration reference greater than or equal to a gas turbine acceleration reference during transient operation.

9. The system of claim 8, wherein the at least one processor is further configured to control one or more guide vanes associated with the torque converter based at least in part on a power command.

10. The system of claim 8, wherein the expected power output of the torque converter is based at least in part on the measured speed and a guide vane command.

11. The system of claim 10, wherein the guide vane command is based at least in part on the measured speed.

12. The system of claim 8, wherein the fuel flow to the gas turbine is controlled when the drive train is coupled to the gas turbine and when the gas turbine is active.

13. The system of claim 8 wherein the expected power output of the torque converter is based at least in part on an output from a torque converter power model.

14. The system of claim 13 wherein the torque converter power model generates the output based at least in part on the measured speed and a parameter associated with the one or more guide vanes.

15. An apparatus for controlling a gas turbine drive train comprising:
   at least one processor configured to execute computer-executable instructions to:
      receive measured speed associated with a drive train;
      control fuel flow to a gas turbine based at least in part on a speed command and the measured speed;

control one or more guide vanes associated with a torque converter based at least in part on the speed command and an expected power output of the torque converter, wherein controlling the one or more guide vanes comprises adjusting a position of the one or more guide vanes; and selectively coordinate respective torque contributions from the torque converter and the gas turbine, wherein selectively coordinating torque contributions comprises biasing a torque converter acceleration reference greater than or equal to a gas turbine acceleration reference during transient operation.

16. The apparatus of claim 15, wherein the at least one processor is further configured to control one or more guide vanes associated with the torque converter based at least in part on a power command.

17. The apparatus of claim 15, wherein the expected power output of the torque converter is based at least in part on the measured speed and a guide vane command, wherein the guide vane command is based at least in part on the measured speed.

* * * * *